US006483595B1

(12) United States Patent
Yakovlev et al.

(10) Patent No.: US 6,483,595 B1
(45) Date of Patent: Nov. 19, 2002

(54) THREE DIMENSIONAL OPTICAL SCANNER

(75) Inventors: Yurii Olegovich Yakovlev; Vladimir Ivanovich Grigorievsky; Astrelin Andrey Vitalievich; Alex Veniaminovitch Sherstuk, all of Moscow (RU); Petr M. Petrov, Exton, PA (US)

(73) Assignee: Basis Software, Inc., West Chester, PA (US)

( * ) Notice: Subject to any disclaimer, the term of this patent is extended or adjusted under 35 U.S.C. 154(b) by 0 days.

(21) Appl. No.: 09/620,538

(22) Filed: Jul. 22, 2000

(51) Int. Cl.[7] .................. G01B 11/24; G01B 11/30; G01C 3/08
(52) U.S. Cl. .................. 356/607; 356/5.1; 356/5.15
(58) Field of Search .................. 356/5.1, 5.15, 356/606, 607, 608

(56) References Cited

U.S. PATENT DOCUMENTS

| | | | | |
|---|---|---|---|---|
| 3,636,250 A | * | 1/1972 | Haeff .................. | 178/6.5 |
| 3,778,159 A | * | 12/1973 | Hines et al. .................. | 343/12 |
| 3,881,802 A | | 5/1975 | Helava .................. | 350/6 |
| 3,945,729 A | * | 3/1976 | Rosen .................. | 356/5 |
| 4,297,030 A | * | 10/1981 | Chaborski .................. | 356/5 |
| 4,470,698 A | | 9/1984 | Green, Jr., et al. .......... | 356/152 |
| 4,498,778 A | * | 2/1985 | White .................. | 356/376 |
| 4,537,502 A | * | 8/1985 | Miller et al. .................. | 356/5 |
| 4,657,394 A | | 4/1987 | Halioua .................. | 356/376 |
| 4,698,498 A | * | 10/1987 | Mahoney et al. .......... | 250/234 |
| 4,717,224 A | | 1/1988 | Diehl et al. .................. | 350/6.9 |
| 4,822,974 A | | 4/1989 | Leighton .............. | 219/212.67 |
| 5,164,733 A | * | 11/1992 | Nettleton et al. ............. | 342/54 |
| 5,210,587 A | * | 5/1993 | Ohmamyuda et al. ........ | 356/5 |
| 5,391,165 A | | 2/1995 | Fountain et al. ............... | 606/4 |
| 5,404,388 A | | 4/1995 | Eu .............................. | 379/24 |
| 5,481,392 A | | 1/1996 | Damer .................. | 359/210 |
| 5,552,878 A | * | 9/1996 | Dillard .................. | 356/5.07 |
| 5,563,701 A | * | 10/1996 | Cho .................. | 356/5.15 |
| 5,583,694 A | | 12/1996 | Takahashi et al. .......... | 359/557 |
| 5,589,941 A | * | 12/1996 | Sabater et al. .............. | 356/376 |
| 5,608,529 A | * | 3/1997 | Hori .................. | 356/376 |
| 5,608,580 A | | 3/1997 | Quadri .................. | 359/831 |
| 5,686,731 A | * | 11/1997 | Wiles et al. .......... | 250/559.22 |
| 5,694,204 A | * | 12/1997 | Nakase et al. ............. | 356/5.15 |
| 5,708,498 A | * | 1/1998 | Rioux et al. .................. | 356/73 |
| 5,710,621 A | * | 1/1998 | Tamura .................. | 356/5.15 |
| 5,841,522 A | * | 11/1998 | Dillon et al. ................. | 356/5.1 |
| 5,870,191 A | * | 2/1999 | Shirley et al. .............. | 345/356 |
| 5,889,435 A | | 3/1999 | Smith et al. ................. | 331/1 A |
| 5,940,170 A | * | 8/1999 | Berg et al. .................. | 356/5.1 |
| 5,966,253 A | | 10/1999 | Tanaka et al. .............. | 359/837 |
| 6,049,297 A | | 4/2000 | Ducharme et al. .......... | 341/111 |
| 6,212,480 B1 | * | 4/2001 | Dunne .................. | 702/159 |
| 6,288,777 B1 | * | 9/2001 | Froehlich .................. | 356/5.15 |

FOREIGN PATENT DOCUMENTS

WO    WO 99/17135    4/1999

* cited by examiner

*Primary Examiner*—Thomas H. Tarcza
*Assistant Examiner*—Brian K. Andrea
(74) *Attorney, Agent, or Firm*—Reed Smith LLP

(57) ABSTRACT

A scanner for scanning three-dimensional objects, wherein the distance between the scanner and the object for each measured location is derived by determining the phase difference between a generated light beam, and light received off of the object being scanned. The phase difference is determined by mixing the modulation signal for the generated light with a second modulation signal, and also mixing the received light signal with the second modulation signal. Additionally, an approximation of the amplitude of the mixed received light signal and the second modulation signal is used in conjunction with the received light signal to generate a correction for delay inherent in a photoreceiver used in the scanner. The approximation and raw receiver signal may also be used to obtain texture information from a surface being scanned. The distance between two points may also determined by the apparatus and method of this invention.

4 Claims, 13 Drawing Sheets

THREE DIMENSIONAL OPTICAL SCANNER

FIELD OF THE INVENTION

The present invention pertains to an apparatus and method for determining the distance between two points. More specifically, the present invention pertains to a three dimensional scanner which determines a distance between a known position and the surface of an object by measuring phase shift associated with collimated light transmitted from the known position, reflected, scattered, or dispersed off of the surface being measured, and received by an optical receiver associated with the collimated light transmitter, and more particularly to three-dimensional optical scanners.

BACKGROUND OF THE INVENTION

The conversion of geometric data associated with a surface to digitized data is important for the generation of computer graphics. These computer graphics can be used in applications including, but not limited to, virtual reality, computer games, and multimedia presentations. The digitized data can be used for presentations regarding artwork, such as a museum being able to catalog or provide three dimensional models of famous sculptures without harming the original sculpture. Digitizing may also be used in other fields, such as manufacturing, where the determination of the shape of an object can be used to generate profiles for computer-aided machining, as well as for determining the dimensional accuracy of finished products.

The conversion of geometric data can be accomplished by the repetitive measuring of the distance between the surface and a known position using a device with an electrical/electronic output. Early computerized measuring machines (hereafter CMM's) used mechanical probes, which were repetitively advanced into contact and retracted from a surface to determine the distance between the surface and a known location.

More recent devices have used a beam of light to determine the distance between the source and the surface. In U.S. Pat. No. 4,470,698 to Green, Jr., et al., a system is shown which uses a reflected beam of light for measuring distances. The Green reference is directed towards a system for optimally determining the orientation of counter-rotating optical wedges used to direct a beam of light for scanning purposes.

U.S. Pat. No. 4,698,498 to Mahoney et al. describes a three dimensional scanner which uses separate optical wedge pairs for scanning horizontal and vertical axes. By counter-rotating the optical wedges at a common rotational speed, the deflection of a light beam is constrained along a linear path. By using one pair of counter-rotating optical wedges to direct a generated light beam along a linear path, with the position of the path determined by the rotational position of the optical wedges. By reflecting the light off of an elevation mirror, the light transmitter can cause the beam to sweep a rectangular area. By reflecting returning light off of the elevation mirror and through a pair of optical wedges, the system can receive reflections of the light beam, and focus the beam onto a photoreceiver.

The prior art measurement of phase shift used in an application such as described in the Green patent relies on mixing the measured signal with a reference frequency signal, and determining the frequency difference. The phase difference is measured as a time difference between zero-crossing transitions of the measured periodic signal. Any noise in the system, however, can result in errors in the measured time difference. In order to obtain sufficient accuracy, the measurement of a particular distance must be either prolonged or multiply repeated to allow averaging of the time value to minimize the effect of any noise. The resulting impact on the system is an increase in the time required to obtain accurate distance measurements. When multiple measurements are required to derive a surface profile, and each measurement requires a longer dwell time, the overall scanning rate is reduced.

Also, in order to minimize the effect of noise on the signal measurement, band-pass filters are employed. The band-pass filters cause limited bandwidth, which results in time domain distortions of the measured phase shift. Accommodating these distortions also results in a reduction of the rate at which distance measurements can be accurately obtained.

The nature of available photoreceivers also inserts uncertainty into the system. The signal delay of the photoreceiver is dependent upon the intensity of the light received, and upon the distribution of the light intensity on the active surface of the receiver, which is defined by the angle between the scanning beam and the optical axis of the device.

In order to accommodate this dependence, it is necessary to know the phase, amplitude, and deflection angle of the light beam. As a result, measuring phase shift between electrical signals is not sufficient for accurate distance measurement. This problem is described in the article in Yakovlev W. W., *Phase distortions in Germanium Avalanche Photo-Diodes*, The Journal of Optical-mechanic industry (Rus), 1983, N12, p.13–14. This article provided the following equation for assessing the delay inherent in a photo-diode:

$$tg\varphi = \frac{1}{2} \cdot \frac{1 + 3 \cdot \left(\frac{u_0 - i \cdot R}{u_1}\right)^2}{\left(\frac{u_0 - i \cdot R}{u_1}\right) \cdot \left(1 - \left(\frac{u_0 - i \cdot R}{u_1}\right)^2\right)} \cdot \frac{u_{m1} + u_{m3}}{u_{m1}} \cdot \frac{u_{m2}}{u_1}$$

where:
- ψ is the additional phase shift due to amplitude dependence
- $u_0$ is the offset voltage applied to the photo-diode
- $u_1$ is the threshold voltage of the photo-diode
- $u_{m1}$, $u_{m2}$, and $u_{m3}$ are the amplitudes of the harmonic components of the received signal modulation
- i is the average photo-current
- R is the internal resistance of the photo-diode

SUMMARY OF THE INVENTION

The present invention overcomes these limitations by converting the output signal of the photoreceiver into a digitized signal, and comparing the digitized signal to a digitized reference differential signal corresponding to the generated light beam.

The optical scanner of the present invention may include a means for generating a first electronic modulation signal, a means for generating a second electronic modulation signal, and a means for generating a modulated beam of light, wherein the modulation of the light beam corresponds to the first electronic modulation signal.

A means for causing the modulated beam of light to be directed at a location on the surface to be measured is disposed between the means for generating a modulated beam of light and an object being measured. The means for causing the modulated beam of light to be directed at a location on the surface to be measured further provides a signal defining the orientation of the scanner to the object.

A means for receiving light from a surface being measured is disposed on the opposite side of the means for causing the beam of modulated light to be directed from the object being scanned. The means for receiving light includes a means for generating an output signal, which corresponds to the received light A first mixer combines the first and second modulation signals to form a reference differential signal. A second mixer combines the output of the photoreceiver and the second modulation signals to form a mixed receiver signal. First and second analog-to-digital converters convert the reference differential signal and mixed receiver signal to form a digitized reference differential signal and a digitized mixed receiver signal.

A third analog-to-digital converter is provided to digitize DC and low frequency components of the raw receiver signal (photocurrent). The digitized raw receiver signal, digitized reference differential signal, and digitized mixed receiver signal are then communicated to a digital signal processor.

The digital signal processor determines a distance between the scanner and the object being scanned based on the phase difference between the digitized reference differential signal and the digitized mixed receiver signal. The digital signal processor then determines a correction factor to correct for delay inherent in photoreceivers by approximating the amplitude of the digitized mixed receiver signal and using this data in conjunction with the digitized raw receiver signal to determine the necessary correction, which is applied to the phase-derived distance to determine a more accurate distance. The distance value and position information identifying the location of the scanner derived distance are then communicated to an interface, so that the data can be communicated to a computer or other image processing element.

In a simple form, the invention is embodied in an apparatus for measuring the distance between two points having a photoreceiver which has an output signal. A converter compares the output signal to a digitized reference differential signal corresponding to a generated light beam. The comparison results in a resultant value which corresponds to the distance between the two points. The comparator further determines a correction factor for delays inherent in the photoreceiver. The correction factor applied to the resultant value provides a corrected resultant value.

Methodically, the invention is embodied in a process which involving converting an output signal from a photoreceiver into a digitized signal, and comparing the digitized signal to a digitized reference differential signal corresponding to a generated light beam. The comparison produces a resultant value, which corresponds to the distance between the two points. Also, a correction factor for delays inherent in the photoreceiver is determined based on the digitized output signal of the photoreceiver. This correction factor is applied to the resultant value to determine a corrected resultant value.

DETAILED DESCRIPTION OF A PREFERRED EMBODIMENT

Figure 1:
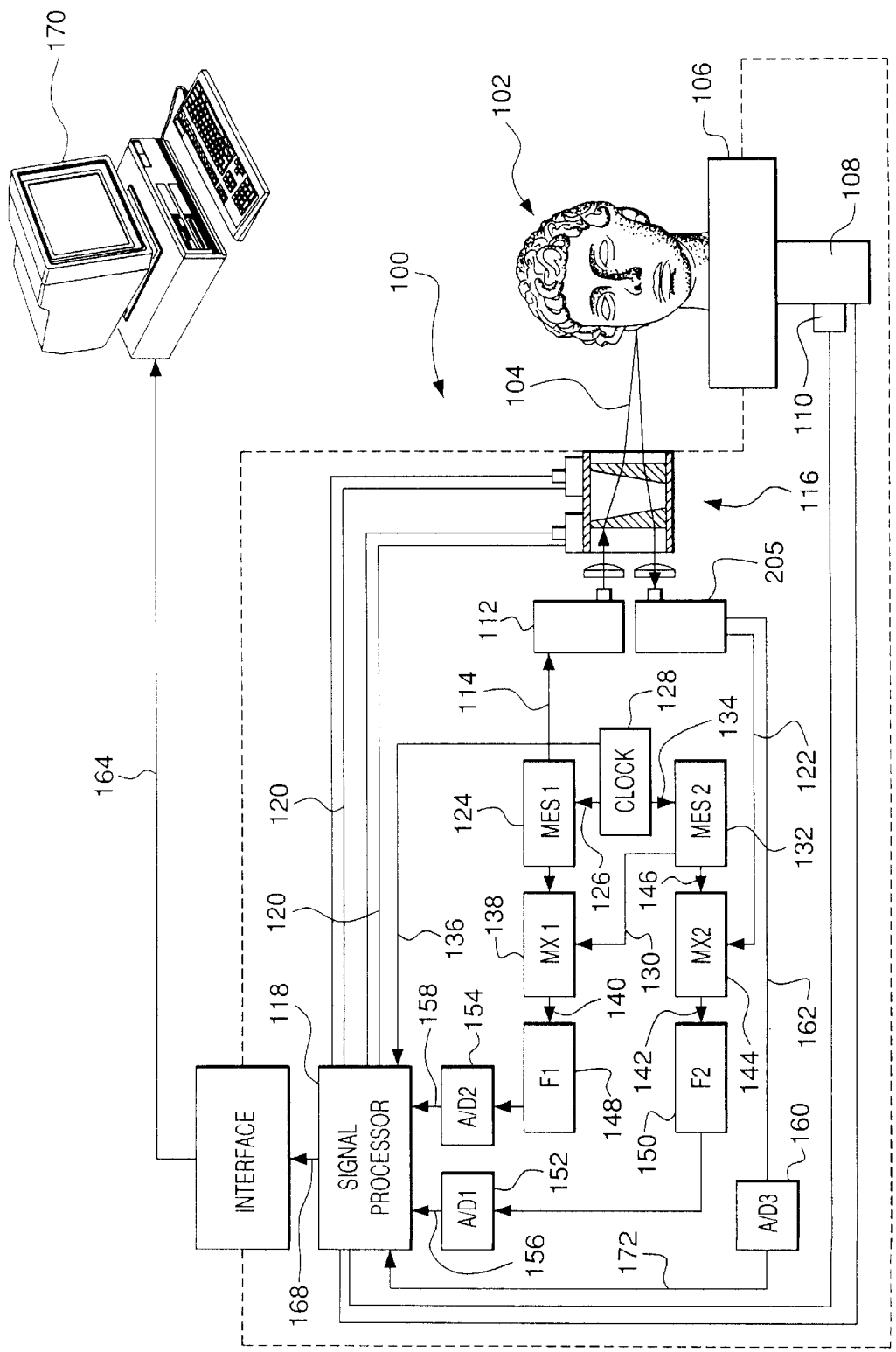
FIG. 1 shows the components of a scanner comprising an embodiment of the present invention.

Referring to FIG. 1, wherein like numbers represent like elements, a scanner 100 embodying the present invention is shown. An object 102 being scanned is located such that a beam of light 104 can be directed towards the object 102 from the scanner 100. The object 102 may be placed on a rotary table 106. The rotary table 106 may include a positioning motor 108 and a position encoder 110. The rotary table 106 may also include additional degrees of freedom, to allow different aspects of an object 102 being scanned to be oriented relative to the scanner 100.

The beam of light 104 is generated by a light generator 112, which is preferably a modulated laser. Alternatively, a semi-conductor light-emitting diode may be used. Other light sources may also be used, wherein the light may be filtered and collimated to provide a light beam. The principal required parameter of the light beam is that it be modulated.

A modulating electronic signal 114 is fed to the light generator 112. The modulating electronic signal 114 is generated by a first modulation signal generator (hereafter "MES1"). This signal 114 is fed to a laser or light-emitting diode or to an external modulator, allowing the generated light beam 104 to have signal characteristics corresponding to the modulating electronic signal 114, both in frequency and intensity.

Figure 2:
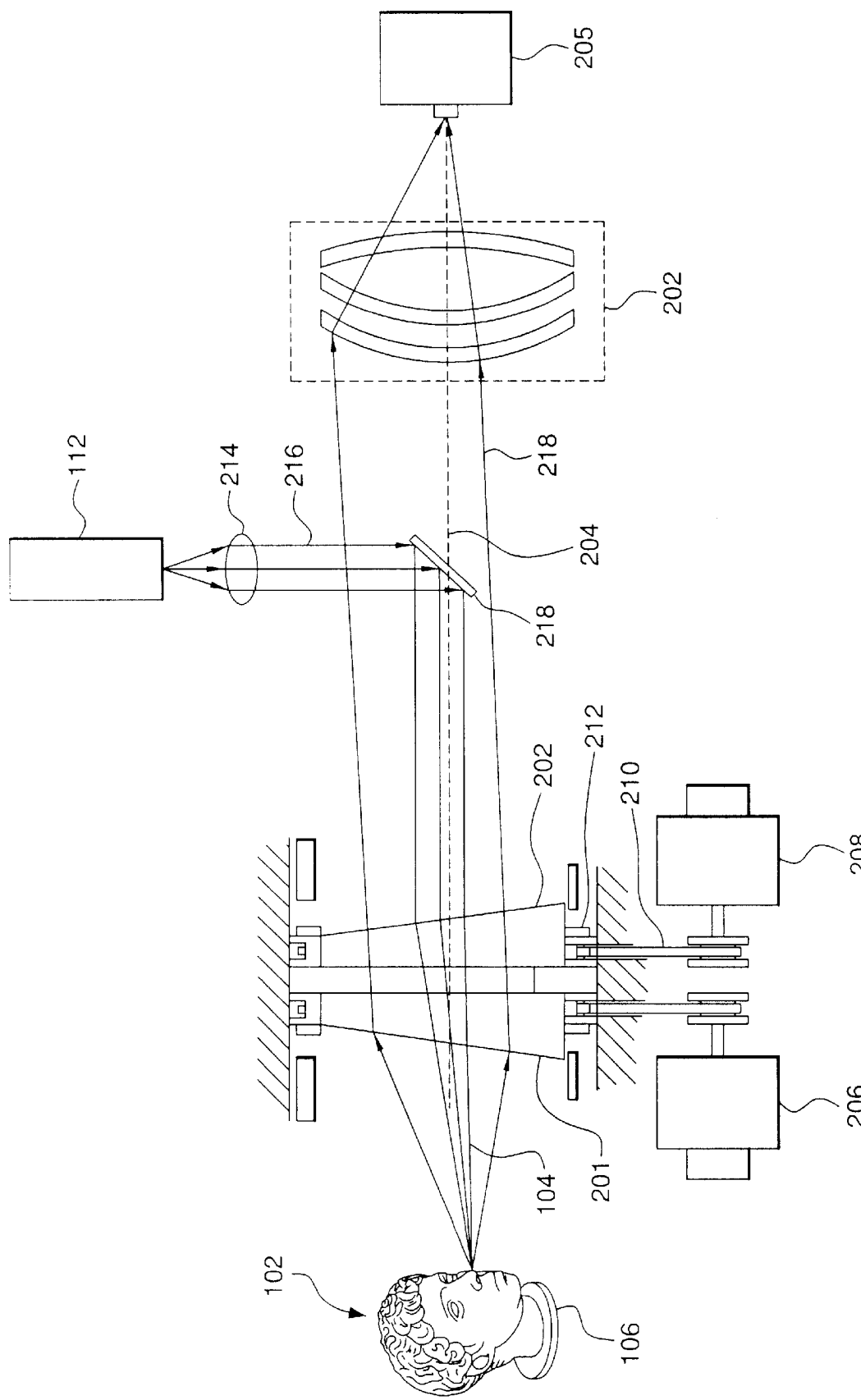
FIG. 2 shows the optical components of the illustrated embodiment.

The beam of light 104 is directed from the scanner 100 to the object 102 by an optical deflector 116. In a preferred embodiment, as shown in FIG. 2, the optical deflector 116 is a pair of rotating optical wedges 201, 202. The optical wedges 201, 202 are rotatable around an axis which is substantially parallel to the optical axis 204 of a photoreceiver 205.

Figure 3:
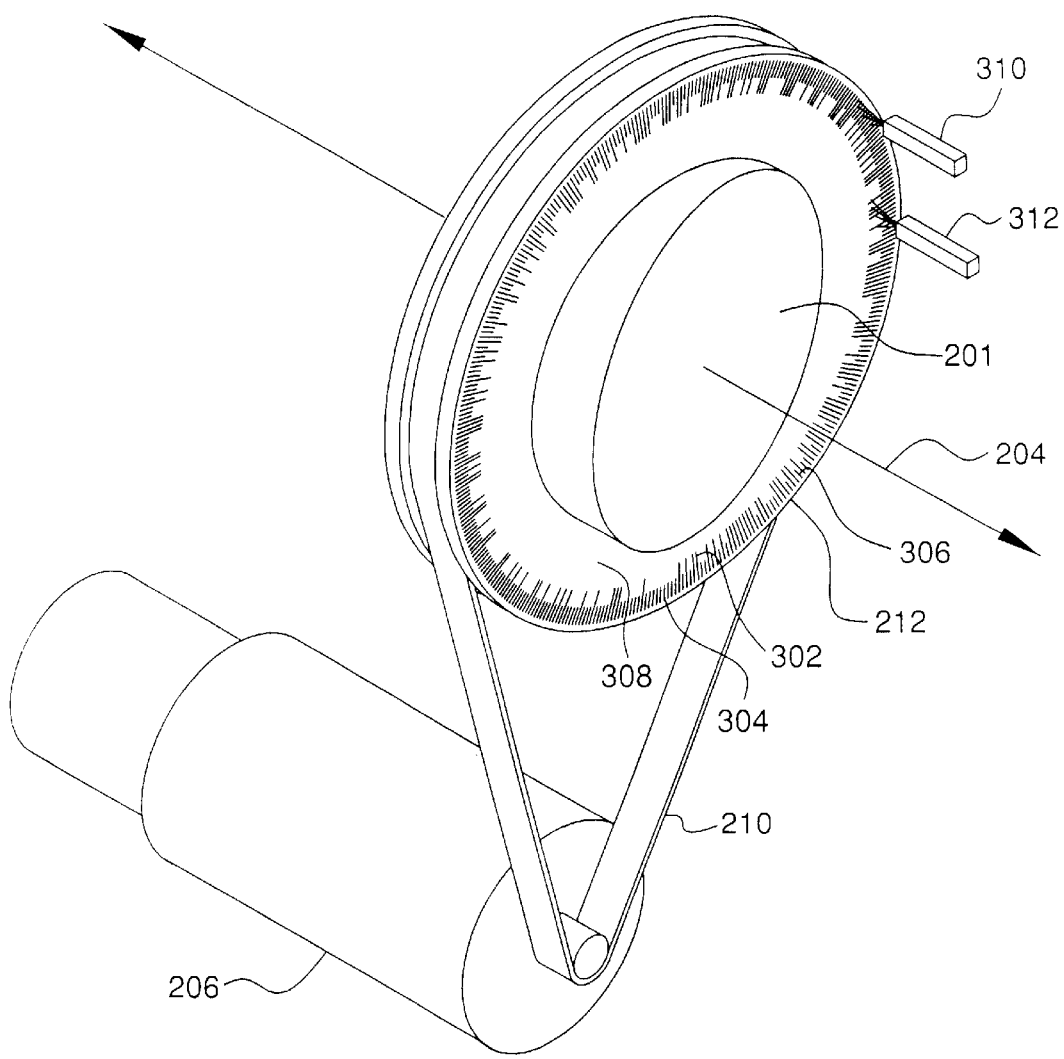
FIG. 3 shows the details of an optical wedge as used in the illustrated embodiment.
Figure 4:
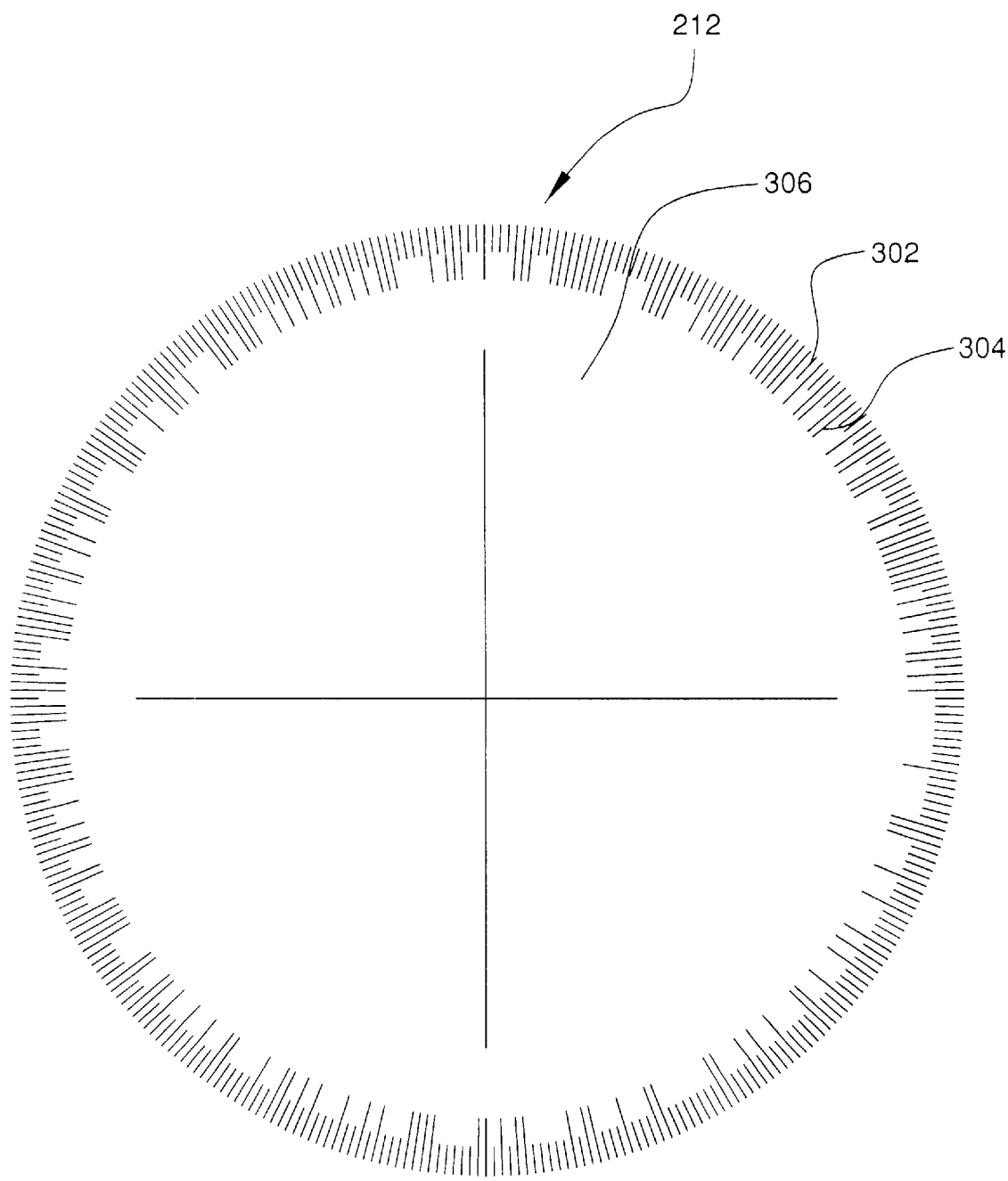
FIG. 4 shows an optical wedge position encoding system as used with the illustrated embodiment.

The rotational positions of the optical wedges 201, 202 are controlled by a first 206 and a second 208 wedge position motor. The first 206 and second 208 wedge position motors are connected to the first 201 and second 202 optical wedges by a belt drive transmission 210. Alternatively, ring motors, a hollow shaft torque motor, or other appropriate drive may be used. Position encoder rings 212 are attached to the optical wedges 201, 202. As shown in FIG. 3, a position encoder ring 212 contains two patterns 302, 304 of black segments 306 on a white background 308. Alternatively, opaque segments or their equivalents may be used on a transparent encoder ring. As shown in FIG. 4, the outer pattern of segments 302 is uniform in distribution. The inner pattern 304 of segments is non-uniform. A first 310 and a second 312 sensor each scans pattern of segments as the encoder ring 212 moves with the optical wedge 201. The sensors 310, 312 sense each transition from black to white. The combined output of the two sensors 310, 312 allows the signal processor 118 (shown in FIG. 1) to determine the rotational orientation of the optical wedge 201.

The illustrated embodiment uses 360 positions on the inner 304 and outer 302 patterns. The outer pattern 302 thus has 360 black or opaque segments, separated by 360 white or transparent segments. The inner pattern 304 includes 155 positions having black or opaque segments and 205 positions having white or transparent segments, each position being separated by a white or transparent segments, distributed as follows:

0,0,0,0,0,0,0,0,0,1,0,0,0,0,0,0,1,0, 1,0,0,0,0,1,0,0,0,1,0,0,0,
0,1,0,1,0, 1,0,0,0,1,0,0,1,0,0,0,0,0,1,0,0,1,0, 1,0,0,0,1,1,0,
0,0,0,0,0,0,1,1,0,0,0, 1,0,0,0,1,1,0,1,0,0,0,0,0,1,1,0,1,0,
1,1,0,0,0,0,0,1,0,1,1,0,0,0,1,0,1,0, 0,1,0,0,0,1,0,1,0,1,1,0,
0,1,0,0,0,0, 1,1,0,0,1,0,0,1,0,0,1,0,1,1,0,0,1,1, 0,0,0,0,1,0,
0,1,1,0,0,0,1,1,0,0,1,1, 0,1,0,0,1,0,0,1,1,0,1,1,0,0,0,0,1,1,
0,1,1,0,1,0,0,0,1,0,1,1,0,1,0,0,1,1, 0,0,1,0,1,0,0,1,1,1,0,0,
0,0,0,0,1,1, 1,0,0,0,1,0,0,1,1,1,0,1,0,0,0,0,1,1, 1,0,1,0,1,0,
0,1,0,1,0,1,0,1,0,1,1,0, 1,0,1,0,1,1,1,0,0,0,0,1,0,1,1,1,0,0,
1,0,0,0,1,1,1,0,0,0,1,0,1,0,1,1,1,0, 0,0,0,0,1,1,1,1,0,0,0,1,
0,1,1,1,1,0, 1,0,0,0,1,1,1,1,0,1,0,1,1,0,1,1,0,0, 1,0,1,1,0,1,
1,1,0,0,0,1,1,0,1,1,1,1, 1,1,1,1,0,1,0,1,0,1,0,0,1,1,0,1,0,1

This pattern is shown in FIG. 4, and allows the signal processor 118 to accurately determine the position of an optical wedge 201 after 9 segments have passed an outer sensor 310. An alternate pattern, using 720 positions on both the inner 304 and 302 outer pattern, allows the position of an optical wedge 201 to be accurately determined after 10 positions have passed the sensor 310 sensing the outer pattern 302. The 720 position pattern thus allows determination of the position of an optical wedge 201 to be accomplished in a shorter arc of travel. The 720 position pattern of the inner pattern 304 is coded as follows:

0,0,0,0,0,0,0,0,0,1,0,0,0,0,0,0,1,0, 1,0,0,0,0,0,1,0,0,0,1,
0,0,0,0,0,1,0,1,0, 1,0,0,0,0,1,0,0,0,0,1,0,0,1,0,0,0,0,0,0,
1,0,0,1,0,1,0,0,0,0,1,1,0,0,0,0,0,0,0,0, 1,1,0,0,0,1,0,0,0,0,
1,1,0,1,0,0,0,0,0,0, 1,1,0,1,0,1,0,1,0,0,0,1,0,0,0,1,0,1,0,0,
0,1,0,1,0,1,0,1,0,0,1,0,0,0,0,1,0,1,0,0, 1,0,0,1,0,0,0,1,0,0,
1,0,0,1,0,1,0,1,0,0, 1,1,0,0,0,0,0,1,0,0,1,1,0,0,0,1,0,1,0,0,
1,1,0,1,0,0,0,0,1,0,0,1,1,0,1,1,0,0,0,0,0,0, 0,1,0,1,1,0,0,0,0,0, 40
1,1,0,0,1,0,0,0,0,0, 1,1,0,1,1,0,0,1,0,0,0,0,1,1,0,0,1,0,0,0,
1,0,0,1,1,0,0,1,0,0,1,1,0,0,0,0,0,0, 1,1,1,0,0,0,0,1,0,0,0,
0,1,1,0,0,0,0,1,0,0, 1,1,1,0,1,0,0,0,0,0,1,1,1,0,1,0,0,1,0,0,
0,1,1,0,1,0,0,1,0,0,1,1,1,0,0,0,0,0, 1,1,1,1,0,0,0,1,0,0,
0,1,1,1,0,0,0,1,0,0, 1,0,1,1,0,0,0,0,1,0,0,1,1,1,1,1,0,0,0,0,0, 45
1,0,1,1,0,0,0,0,0,1,1,1,1,0,0,1,0,0, 0,0,1,1,0,0,1,0,0,0,
0,1,1,1,0,0,1,0,0, 1,0,1,1,0,0,1,0,1,0,0,0,1,1,0,0,1,0,1,
0,0,1,0,1,0,0,1,1,0,0,1,0,1,1,0,0,1,1, 0,0,0,0,1,1,0,0,1,1,
0,0,1,0,1,1,0,1,0,0, 0,0,1,0,1,1,0,1,0,1,0,0,1,0,1,1,0,1,1,0,
0,0,1,0,1,1,0,1,1,1,0,0,0,0,1,1,0,1,1,1, 0,0,1,1,0,0,0,1,1,0, 50
0,0,1,1,1,0,0,1,1,0, 1,0,0,1,1,0,0,1,1,0,1,0,1,1,0,0,0,0,1,0,
1,0,1,1,0,0,0,1,1,0,1,0,1,1,1,0,0,0,1,0, 1,0,1,1,1,0,0,1,1,1,
0,0,0,1,1,0,0,1,1,1, 0,0,1,1,1,1,0,0,1,1,0,0,1,1,1,1,0,1,0,0,
0,0,1,1,1,1,0,1,0,1,0,0,0,1,1,1,0,1,0,1, 0,0,1,1,1,1,0,1,1,0,
0,0,0,1,1,1,0,1,1,0, 0,0,1,1,1,1,0,1,1,1,0,0,0,1,1,1,0,1,1,1, 55
0,1,0,0,0,1,0,1,1,1,0,1,0,0,1,1,0,1,1,1, 0,1,0,1,0,1,0,1,0,1,
1,0,0,1,0,1,1,1,0,1, 1,0,1,1,1,0,1,1,1,0,0,1,0,0,1,1,0,1,0,1,

As shown in FIG. 3, two position sensors 310, 312 scan encoding rings 212 attached to each optical wedge 201, 202. The wedge position motors 206 are preferably brushless electrical motors, although other suitable drives may be utilized.

The deflection of a light beam 104 passing through the optical wedges 201, 202 can be determined based on knowledge of the orientation of the optical wedges 201, 202. As shown in FIG. 1, the scanner 100 can also control the position of the optical wedges 201, 202 by signals 120 from the signal processor 118 to the brushless motors. Feedback for controlling the position of the optical wedges is provided by the positions determined by the sensors 310, 312.

Alternate light deflectors can also be used. Where the wedges are rotated such that there rotation is of equal magnitude, but opposite direction, the effect on a transmitted beam of light generates an offset along a line, allowing the scanner to sweep along the line and take distance measurements along the line. By orienting the sweep along a vertical axis, such a linear scan allows an object placed in front of the scanner to be incrementally rotated, such that a vertical sweep of measurements is made at each rotational increment.

The rotational position of the object 102 can be varied by placing the object 102 on a rotary table 106 with at least one axis of rotation, wherein the rotary table 106 includes position encoders 110 for determining the orientation of the object 102 relative to the scanner 100. As such, this allows the scanner 100 to be presented with varying aspects of the object 102.

The scan pattern of the light beam 104 can be varied by changing the position of the optical wedges 201, 202. In one implementation, the optical wedges 201, 202 can be rotated in equal but opposite increments, resulting in a linear scan pattern. Such a scan pattern requires extra precision in the positioning of the optical wedges 201, 202, as well as a greater number of rotational increments of the object 102 to provide an adequate scan pattern.

Differential rotations of the optical wedges 201, 202 can also produce other light beam sweep patterns. A presently preferred pattern is a spiral pattern, wherein the spiral has an approximately 22 degree field of view. The field of view is dependent on the particular optical wedges being used. Using 10 degree wedges, made of industry-standard optical glass with a refraction coefficient of 1.513, results in the 22 degree field of view of the described embodiment. Spiral sweep patterns allow scans covering circular fields of view to be used.

Typically, a three dimensional object 102 can be scanned using 4–12 incremental rotations of the object 102 relative to the scanner 100. Possible viewing schemes include:

using four 90-degree or six 60-degree rotations of the object 102 relative to the scanner 100;

viewing the object 102 from 8 orientations, each orientation corresponding to one face of an imaginary cube surrounding the object 102; or viewing the object 102 from twelve orientations corresponding to the vertices of a spatial polyhedron, including six 60-degree rotations around a first axis, and three views from above and three views from below the object 102.

An optical deflector 116 using equal but opposite rotations of the optical wedges 201, 202 can also be used. This linear sweep scan pattern can be accompanied by an elevation or nodding mirror (not shown), such that the light beam 104 can be swept across a rectangular pattern. As each linear sweep is completed, the elevation mirror moves incrementally to allow the linear sweep pattern to scan a different row of points on a surface. Such a configuration allows a scan to be made of a surface on an object 102 without having to move either the scanner 100 or the object 102, as long as the surface being measured is substantially planar, and can be accommodated within the field of view of the combined counter-rotating optical wedges and elevation mirror.

An alternate embodiment of a beam deflector 116 can use rotating polygonal facetted mirrors to deflect the light beam 104. Other implementations using controlled positioning of planar mirrors can also be used.

Alternately, the light beam 104 can be swept over the surface of the object 102 being measured utilizing mechanical positioning means, such as by using a vertical transit for the scanner, with the object being rotated relative to the scanner. Such a system is limited by the positional accuracy and movement speed that can be obtained by the mechanical positioning means used.

As shown in FIG. 2, the generated light beam 104 is passed through a collimating lens 214 to generate a collimated light beam 216. The collimated light beam 216 can be reflected by a mirror 218 to reflect the collimated light beam 216 onto an axis parallel to the axis of rotation 204 of the optical wedges. The path of the collimated light beam 216 is then deflected by the optical wedges 201, 202. The collimated light beam 216 then strikes the object 102 being scanned, and is reflected, diffracted, or dispersed. A portion 218 of this light returns to the scanner 100, passing through the optical wedges 201, 202. This light is focused by a receiver lens 220 onto a photoreceiver 205.

As shown in FIG. 1, the photoreceiver 205 converts the light energy to an electronic signal 122 corresponding to the received light. The light received by the photoreceiver 205 has transient characteristics, such as varying amplitude, corresponding to the light beam 104 that was directed onto the object 102 being scanned. The photoreceiver 205 is preferably filtered to reject light which is not associated with the generated beam of light 104 by filtering out light of other frequencies. The outputted signal 122 from the photoreceiver 205 is hereinafter referred to as the raw receiver signal.

The modulating electronic signal 114 provided to the light generator 112 or laser is generated by a first modulating electronic signal generator 124 (hereafter "MES1"). The signal generated by MES1 124 is synchronized to a clock signal 126 generated by a clock 128. The clock signal 126 is preferably 11.5 MHz. A second modulating electronic signal 130 is generated by a second modulating electronic signal generator 132 (hereafter "MES2"). This signal 130 is also synchronized by a second signal 134 generated by the clock 128. Finally, the clock 128 is also used to generate a timing signal 136 for a signal processor 118, wherein the timing signal 118 has a frequency of preferably 46 MHz, or four times the frequency of the signals 126, 130 for MES1 124 and MES2 132.

In order to determine the distance between the scanner 100 and the object 102 along a specific path, the output of MES1 and MES2 are combined by a first mixer 138 (hereinafter "MX1") to form a reference differential signal 140. A second signal 142 is created by a second mixer 144 (hereinafter MX2) combining the output of the photoreceiver 122 with the output 146 of MES2. This output is hereinafter referred to as the mixed receiver signal 142. The outputs of MX1 and MX2 can be band-pass filtered by a first analog filter 148 and a second analog filter 150, hereafter F1 and F2 respectively. The filtered outputs of MX1 and MX2 are fed to analog to digital converters (hereinafter A/D converters.) The output MX1 is sent to a first A/D converter 152 (hereafter A/D1), and the output of MX2 is sent to a second A/D converter 154 (hereafter A/D2). The output of the A/D converters are a digitized mixed receiver signal 156 and a digitized reference differential signal 158. The sampling rate of the A/D converters 152, 154 is preferably derived from the timing signals.

In addition to the A/D converters for converting the mixed receiver and reference differential signals, a third A/D converter 160 (hereinafter "A/D3") is preferably included for digitizing DC and low frequency components of the raw receiver output 162. This signal is digitized without being combined with any other signals, and provides a reference for compensating delays inherent in the photoreceiver, which delays are related to the intensity or frequency of the signal received by the photoreceiver 205. This signal, together with an approximated amplitude for the mixed receiver signal, may also be used to calculate textural data associated with a surface of an object 102 being scanned.

The digitized data, corresponding to the mixed receiver signal 156, reference differential signal 158, and raw receiver signal 162, are processed in the signal processor 118, according to the algorithms described below.

The signal processor 118 preferably outputs information 164 corresponding to the distance between the scanner and the object being measured, and references defining the deflection of the light beam at that distance. These coordinates are preferably an azimuth corresponding to vertical deflection of the light beam, and a traverse, corresponding to horizontal deflection of the light beam. The signal processor 118 may output these references in other coordinate forms, such as rectilinear coordinates describing the horizontal, vertical, and depth coordinates of the position of the scanned surface.

The signal processor 118 may be connected to a computer interface 166 or data storage element via a signal path 168. The computer interface 166 or data storage element may be implemented as (but not limited to) an IEEE1394 (Firewire) interface, or USB interface, or as a flash memory, or other types of interfaces commonly known in the art.

The information 164 transmitted by the signal processor 118 can be used to form a three dimensional model by defining points which are on the surface of the object being scanned. Once these points are known, the computer can generate a mesh extending between the points, where the mesh is used to generate a surface model. The surface model can then be used for graphics purposes, or other uses. The points defining the surface can be formed into a matrix, and operated on using standard matrix methodologies for transforming the geometry defined by the points.

Analytical Method

The presently preferred method for determining the distance between the scanner 100 and the object 102 along a path is based on computing a difference between the phases of the outputs of the two mixers, MX1 and MX2. This distance value, derived from the phase shift of the receiver signal 122 can be corrected based on the amplitude of the mixed receiver signal 142 and the digitized raw photoreceiver signal (photocurrent) 162, which allows determination of the delay inherent in the photoreceiver 205 as a function of received light, signal amplitude and intensity values, time-dependent values of signals received, and the direction of the scanning beam.

The phase difference is evaluated by correlating the measured digitized signals, reference differential and phase output, with basic signals (which may be, but not limited to: sine and cosine functions, meander functions, Walsh functions, Vilenkin-Krestenson functions, pseudo-random sequences).

Mathematically, the evaluation of the phase of the filtered reference differential signal (p(t)) and the filtered mixed receiver (q(t)) can be expressed via numerical computation of a pair of convolution values for each measured signal (p(t), q(t)):

$$S_x^p(t) = \int_{t-\tau}^{t} p(r) \cdot \sin(\omega \cdot r) \cdot dr \quad \text{and} \tag{1001}$$

$$S_y^p(t) = \int_{t-\tau}^{t} p(r) \cdot \cos(\omega \cdot r) \cdot dr \tag{1002}$$

where:

$\omega$ equals $2\pi \cdot F_d$, where $F_d = |F_{transmitted} - F_{heterodyne}|$, and $\tau$ equals the duration of scanning of an individual segment of the surface of the object being scanned.

The phase of the reference differential signal can be obtained as:

$$\psi^p(t) = \text{arc tg}(S_x^p(t)/S_y^p(t)) \tag{1003}$$

Similar values can be obtained for the mixed receiver signal:

$$S_x^q(t) = \int_{t-\tau}^{t} q(r) \cdot \sin(\omega \cdot r) \cdot dr \quad \text{and} \tag{1004}$$

$$S_y^q(t) = \int_{t-\tau}^{t} q(r) \cdot \cos(\omega \cdot r) \cdot dr \tag{1005}$$

where:

$\omega$ equals $2\pi \cdot F_d$, where $F_d = |F_{transmitted} - F_{heterodyne}|$, and $\tau$ equals the duration of scanning of an individual segment of the surface of the object being scanned.

The phase of the mixed receiver signal can be determined from:

$$\psi^q(t) = \text{arc tg}(S_x^q(t)/S_y^q(t)) \tag{1006}$$

The phase difference between the signals can be obtained as a difference between the phases of the filtered reference differential signal and the filtered mixed receiver signal.

$$\Delta\psi(t) = \psi^q(t) - \psi^p(t) \tag{1007}$$

The amplitude of the mixed receiver signal can be estimated as:

$$A^q(t) = \sqrt{(S_x^{q(t)})^2 + (S_y^{q(t)})^2} \tag{1008}$$

This amplitude value may be used for compensation of the phase/amplitude dependence. Also, this amplitude value, together with the raw receiver signal (photocurrent), can be used for evaluating reflectivity and brightness of the scanned points, thus obtaining texture information for the scanned surfaces.

An initial approximation for the distance to the scanned point can be evaluated in accordance with the following formula:

$$L = \mu^* \Delta\psi + W \cdot J, \tag{1009}$$

where:

$\mu$ is a coefficient, derived from modulation frequency and the propagation speed of light, W is the half wavelength of the modulation frequency, and J is the number of complete wave half-periods, contained within the distance to the object.

Finding J, the number of complete wave half-periods is known in range-finding as the problem of phase uncertainty. The presently preferred method of determining J is scanning each point with several modulation frequencies differing by W, and further solving equation (1009) for each W value.

Alternative methods include for resolving the phase uncertainty problem include:

using constant value for J, based on a priori assumptions about size of the object and a distance to it;

assigning equal J to adjacent scanned points, if their phase values $\Delta\psi$ differ less, than ½; or incrementing J, in the direction of dominating increment of phase values among the adjacent scanned points.

The next approximation for the distance can be computed using the following equation:

$$L^* = L + F(A^y, L, \alpha, I, \Gamma(A^q, \psi^q, A^p, \psi^p)) \tag{1010}$$

wherein:

F( . . . ) Function of multiple variables $A^y$ amplitude of received signal

L Distance, as evaluated without correction value $\alpha, \beta$ Angles between the axis of the scanner and direction to the scanned point Measured photocurrent $A^q$ Amplitude of received signal $\psi^q$ Phase of received signal $A^p$ Amplitude of reference signal $\psi^p$ Phase of reference signal $\Gamma(A^q, \psi^q, A^p, \psi^p)$ A function of $A^q$, $\psi^q$, $A^p$, $\psi^p$ of their time derivatives and convolutions with time-dependent functions (generalized integral/differential function)

One function approximating L* is defined below. Furthermore, as discussed below, the function F( . . . ) is a computable function of 6 scalar variables, which can be described by a tabular function, analytical functions, or a combination of analytical and tabular functions.

Implementation of the Analytical Method

Figure 6:
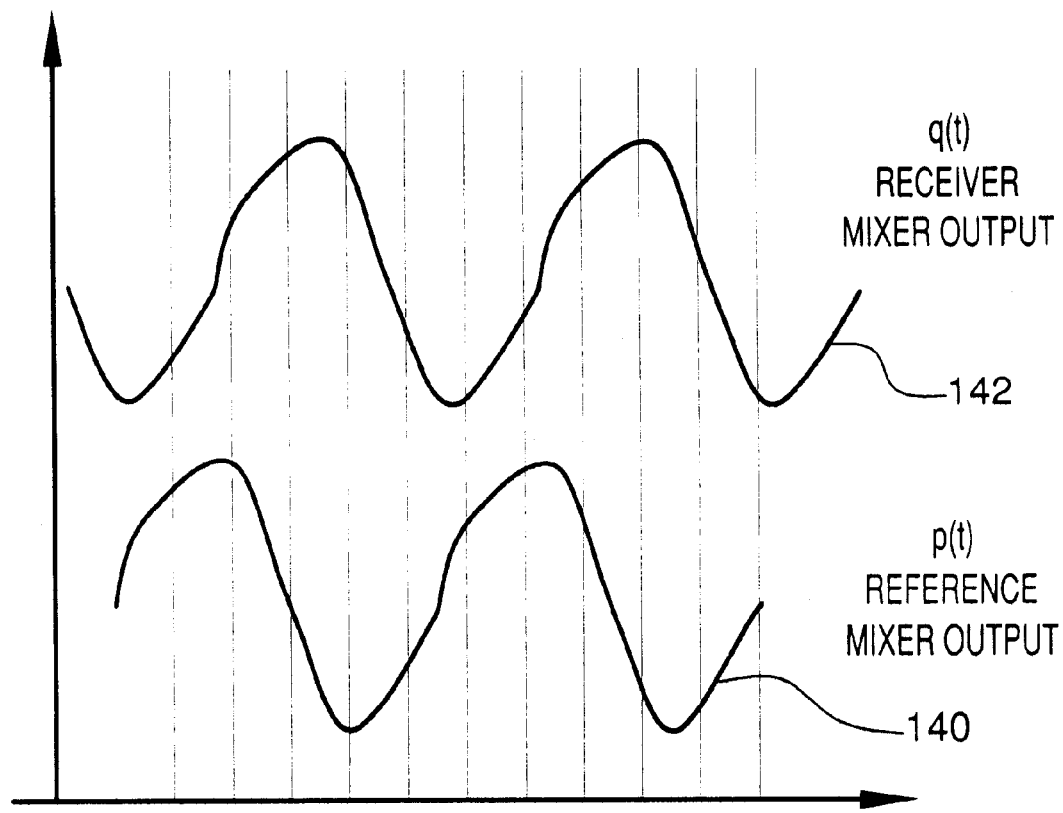
FIG. 6 shows a reference differential waveform and a mixed receiver waveform, illustrating the phase shift inherent in the received signal.
Figure 7:
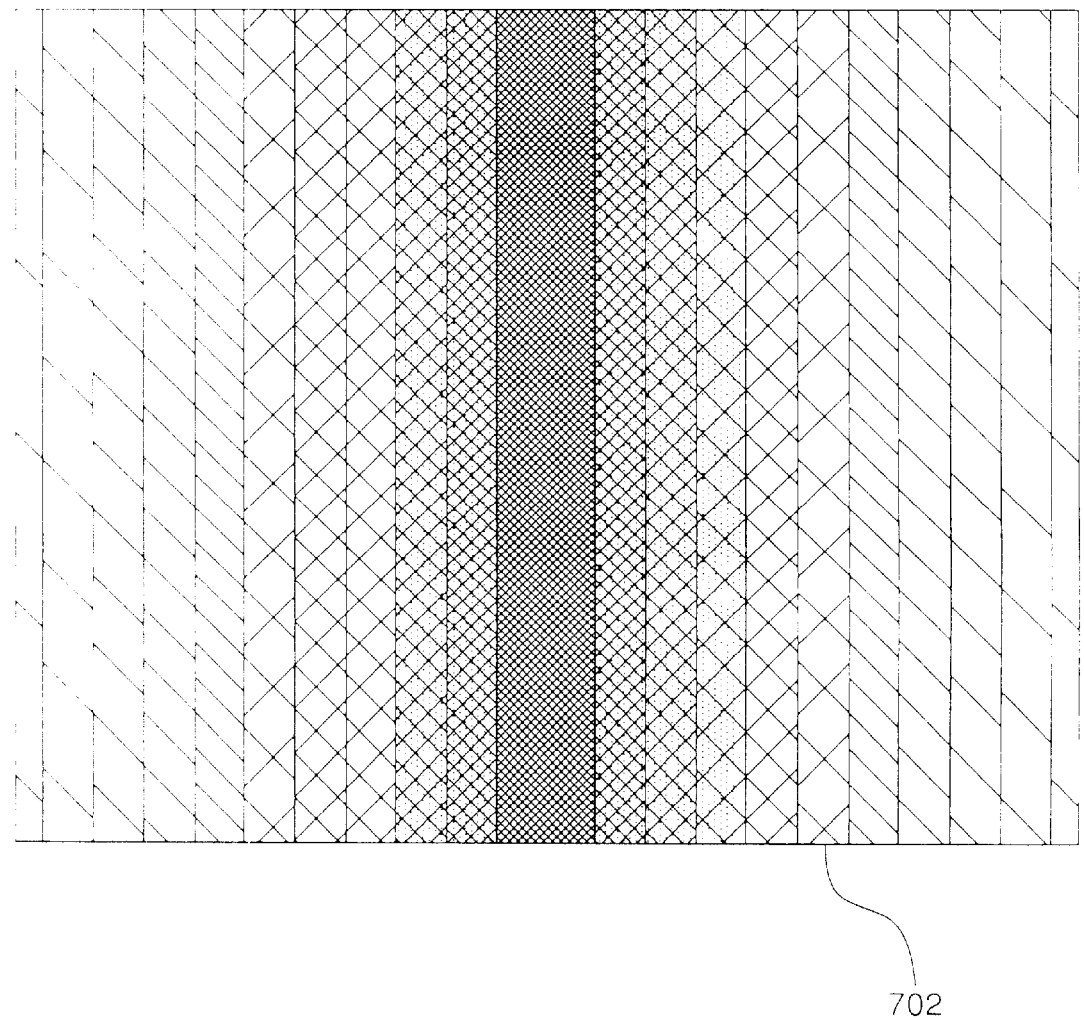
FIG. 7 shows an exemplary test image used to calibrate scanning for textural information.

The reference differential signal 140 and the mixed receiver signal 142, shown for example in FIG. 6, are converted to digitized signals by A/D converters 152, 154, yielding a digitized reference differential signal 158 and a digitized mixed receiver signal 156, wherein the digitized data is clocked by the frequency $F_a$. $F_a$ is related to the difference frequency $F_d$ via rational quantity factor:

$$F_a = (M/N)^* F_d \tag{1011}$$

and $$F_d = F_c/K \tag{1012}$$

where:

$F_a$ Frequency of analog-to-digital conversions $F_d$ Difference frequency, or average frequency of filtered mixers outputs MX1 and MX2

$F_c$ Frequency of master clock generator

N Integer number of periods of difference frequency $F_d$, used for integration, which is connected with integration duration $\tau = N/F_d$ M Integer number of analog/digital conversions per integration duration $\tau$ K Integer number of master clock periods per A/D conversion period The particular values for N, M, and K depend upon the performance of the A/D converters and digital signal processing components used. Exemplary values, for the purposes of describing the invention, are:

M=40

N=5

And

K=6

Accurate relationships between $F_a$ and $F_d$ frequencies according to (1011) can be achieved using PLL frequency synthesizers for MES1 and MES2, synchronized with a foundation frequency $F_f$.

Foundation frequency $F_f$ can be determined from $F_c$ using a frequency divider (counter):

$$F_f = F_c/H \quad (1013)$$

where:

H Integer division coefficient for frequency divider (counter)

Exemplary values for H, for the purposes of describing the invention, are: 2–8.

Synthesized frequencies can be evaluated as:

$$F_m = F_f \cdot \frac{E_m}{B_m} \quad \text{and} \quad (1014)$$

$$F_h = F_f \cdot \frac{E_h}{B_h} \quad (1015)$$

where:

$F_m$ Frequency of modulating signal for light transmitter, produced by MES1

$F_h$ Frequency of heterodyne signal, produced by MES2

$E_m$, $B_m$ Integer numbers, parameters of frequency synthesizer, used for MES1

$E_h$, $B_h$ Integer numbers, parameters of frequency synthesizer, used for MES2

It may also be noted that:

$$F_d = |F_m - F_h| \quad (1016)$$

where exemplary values for the parameters of frequency synthesizer and resulting frequencies, described in (1014, 1015) are:

$F_f$=11.5E6 HZ $E_m$=18834

$B_m$=240

$B_h$=240

$E_h$=18854

$F_m$=902.463 MHz $F_m$=903.421 MHz $F_d$=0.958 MHz $F_c$=46 MHz and $F_a$=7.67 MHz Analog filters F1 and F2 may be designed in such a way to pass signal components with a frequency near $F_d$, and to suppress signal components with frequencies above $F_a/2$. Another requirement to these filters is that their effective bandwidth $F_b$ should be large enough, compared to 1/.

Figure 5:
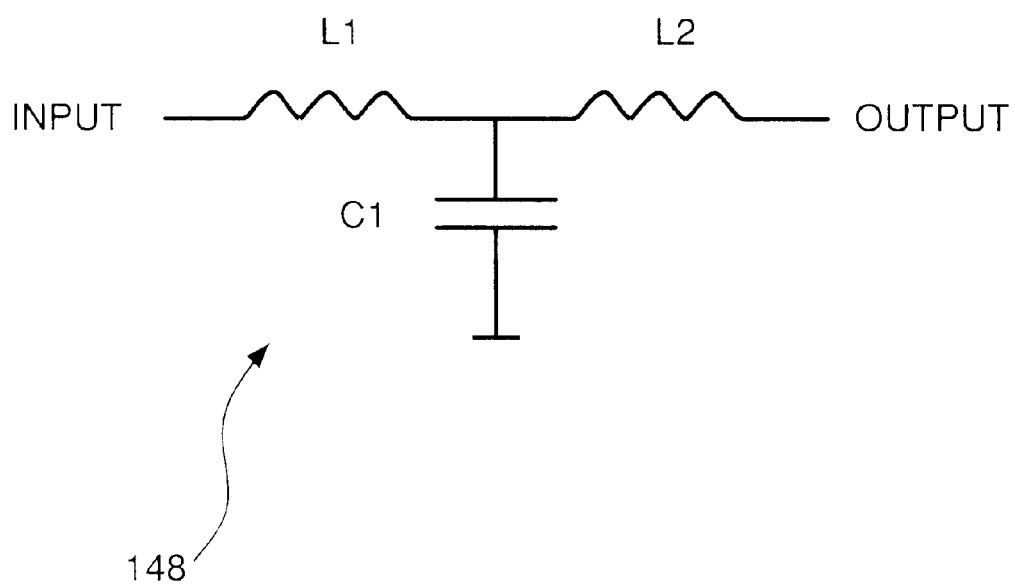
FIG. 5 shows a circuit schematic for a band-pass filter for the illustrated embodiment.

An example of structure of such a filter is represented by FIG. 5. Sample values for the filter components are:

L1=3.9E-6 H

C1=1.5E-9 F

L2=3.9E-6 H configured in a band pass configuration as shown.

In the embodiment described herein, the method for distance evaluation may be based upon the following version of the relation described in function (1010), combining linear and non-linear functions:

$$\sigma L = C_1 \cdot \frac{d\varphi^p}{dt} + C_2 \cdot \frac{d\varphi^q}{dt} + C_3 \cdot A^q + C_4 \cdot (L - L_0)^2 + C_5 \cdot tg(\alpha)^2 + C_6(I - I_0) \quad (1017)$$

where:

| | |
|---|---|
| $C_1$, $C_2$, $C_3$, $C_4$, $C_5$, $C_6$, $L_0$, $I_0$ | constant values |
| $d\varphi^p/dt$ | first time derivative of the phase of reference mixer 21 output. The phase $\varphi^p$ is computed in accordance with (1001–1003), using finite integration methods for (1001–1002), and using finite difference method for computing derivative. |
| $d\varphi^q/dt$ | first time derivative of the phase of receiver mixer MXI output. The phase $\varphi^q$ is computed in accordance with (1001–1003), using finite integration methods for (1001–1002), and using finite difference method for computing derivative. |
| $A^q$ | amplitude of receiver mixer MX2 output, computed in accordance with (1001–1008) |
| $\gamma$ | Angle between the axis of the scanner and direction to the scanned point, derived from the sensor signals. This angle, connected with the before mentioned angles $\alpha$ and $\beta$ with the following geometric relation: $\cos(\gamma) = \cos(\alpha) \cdot \cos(\beta)$ |
| I | DC and low frequency components of the raw received signal (photocurrent), as digitized by the third A/D converter |

Computations in accordance with these formulae can be implemented either in a software program for the Digital Signal Processor (DSP), or in an external processor program (for example, PC computer 170), or in a logic device. Alternately, separate calculations can be performed by different devices within the scanner 100, such as distributing processing between a DSP software program and a logic device (for example: DSP+Field Programmable Gate Array FPGA+additional software program in attached computer.)

These calculations can be accomplished by approximations based on the digitized signals. The aforementioned constants are preferably determined by scanning a known reference surface, and analytically determining the coefficients $C_1$, $C_2$, $C_3$, $C_4$, $C_5$, $C_6$, $L_0$, $I_0$. The integrated values can be obtained by summing the relevant values over the scan time $\tau$. Differential values can also be determined using known approximation techniques.

The preferred embodiment uses continuously moving optical wedges 201, 202 to continuously scan across the surface of the object 102 being scanned. As such, each calculated distance can be associated with a swept segment.

Textural and Color Scanning

The inclusion of the digitized DC and low frequency components of the raw receiver signal 172 allows information associated with the texture of the surface of the object 102 being scanned to be derived. The texture of the scanned object 102 can be characterized by a B value (albedo) assigned to each scanned point.

An initial approximation of a texture value $B_0$ can be obtained as:

$$B_0 = F_{B0}(A^q, I)$$

where:

$F_{B0}$ is a function of two variables, $A^q$ is the amplitude of the signal, and I is the raw received signal (photocurrent).

A possible approximation of the function $F_{B0}$ may be as follows:

$$B_0 = K_a \cdot A^q + K_i \cdot (I - I_B)$$

where $K_a$, $K_i$, and $I_B$ are parameters obtained as a result of scanning a known calibration surface with a known distribution of albedo on it.

An approximation of the texture can be obtained after the whole scanning process of an object 102 is completed, and the surfaces of the scanned objects can be derived, using the relation:

$$B_1 = F_{B1}(B_0, \lambda)$$

where:

$F_{B1}$ a function of two variables $B_0$ Initial approximation of texture function $\lambda$ The angle between the normal to the surface of scanned object at a given point and the direction of scanning beam. Note: this angle can be computed after the scanning process completed, and the surface shape reconstructed for each scanned object.

The function $F_{B1}$ can be approximated as follows:

$$B_1 = \frac{B_0 \cdot (1 + K_C)}{1 + K_C \cdot \cos(\lambda)}$$

where:

$K_c$ Parameter obtained as a result of calibration, ie., scanning a known surface with known distribution of albedo on it.

Figure 8:
FIG. 8 shows a computer-modeled, scanned surface obtained according to the illustrated embodiment.
Figure 8:
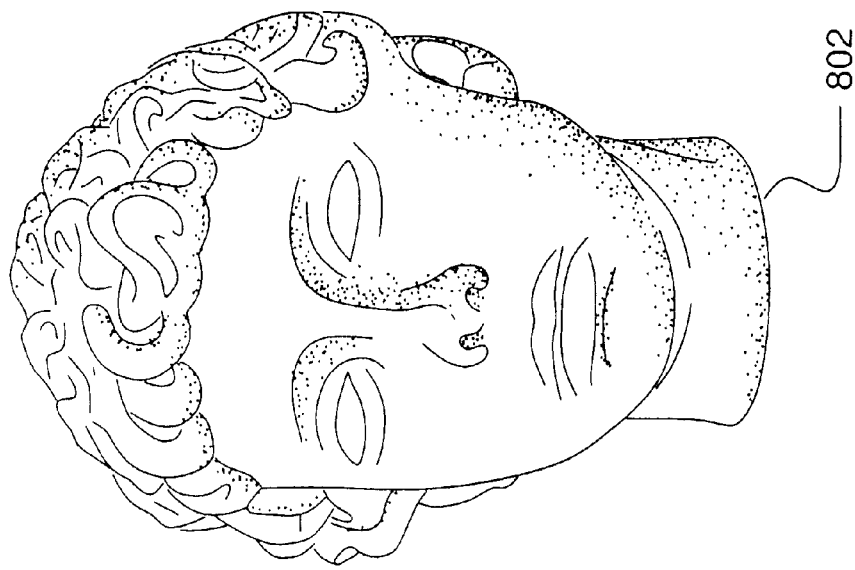
Figure 9A:
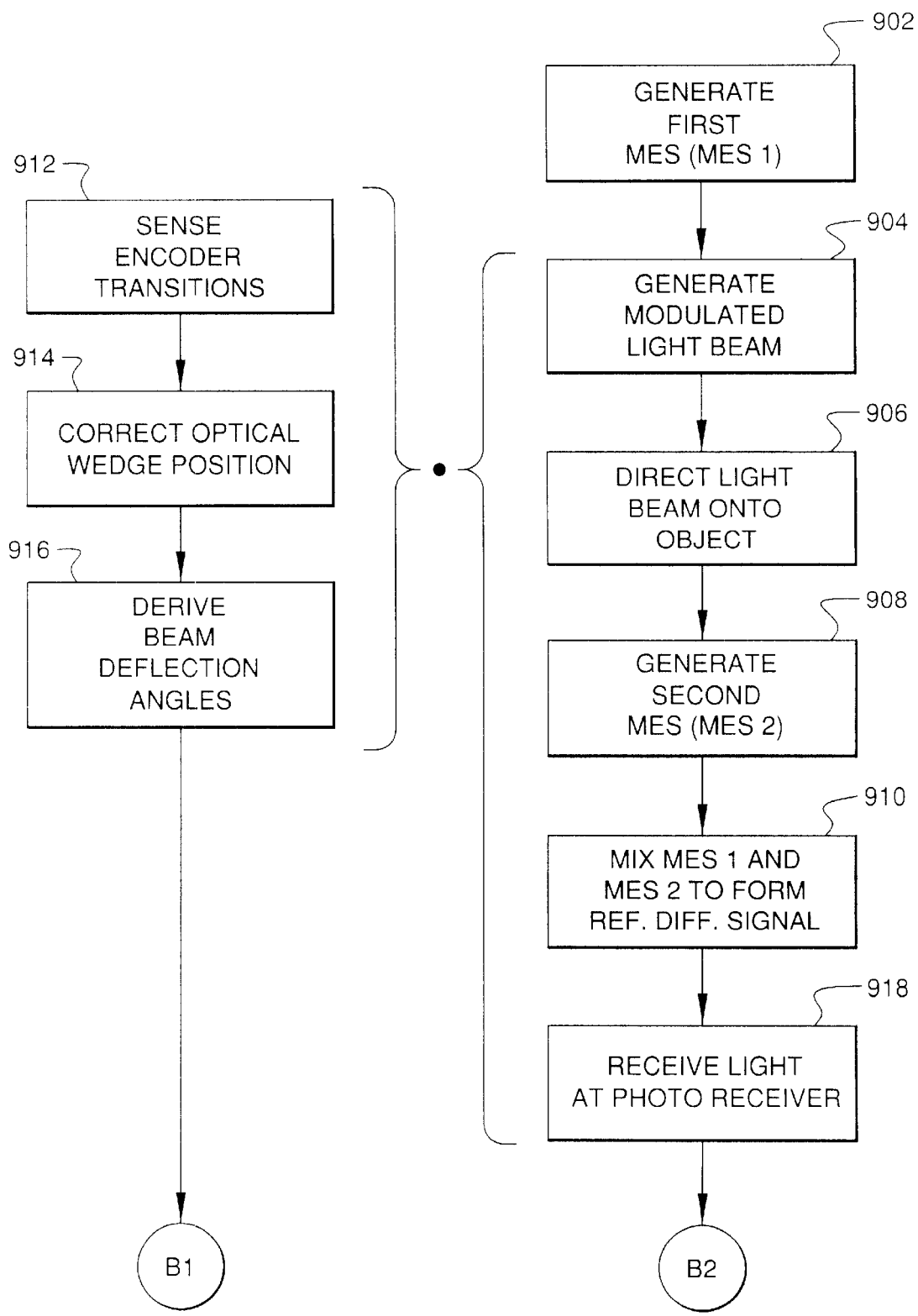
FIG. 9 shows a process flowchart for scanning a three-dimensional object according to the present invention.
Figure 9B:
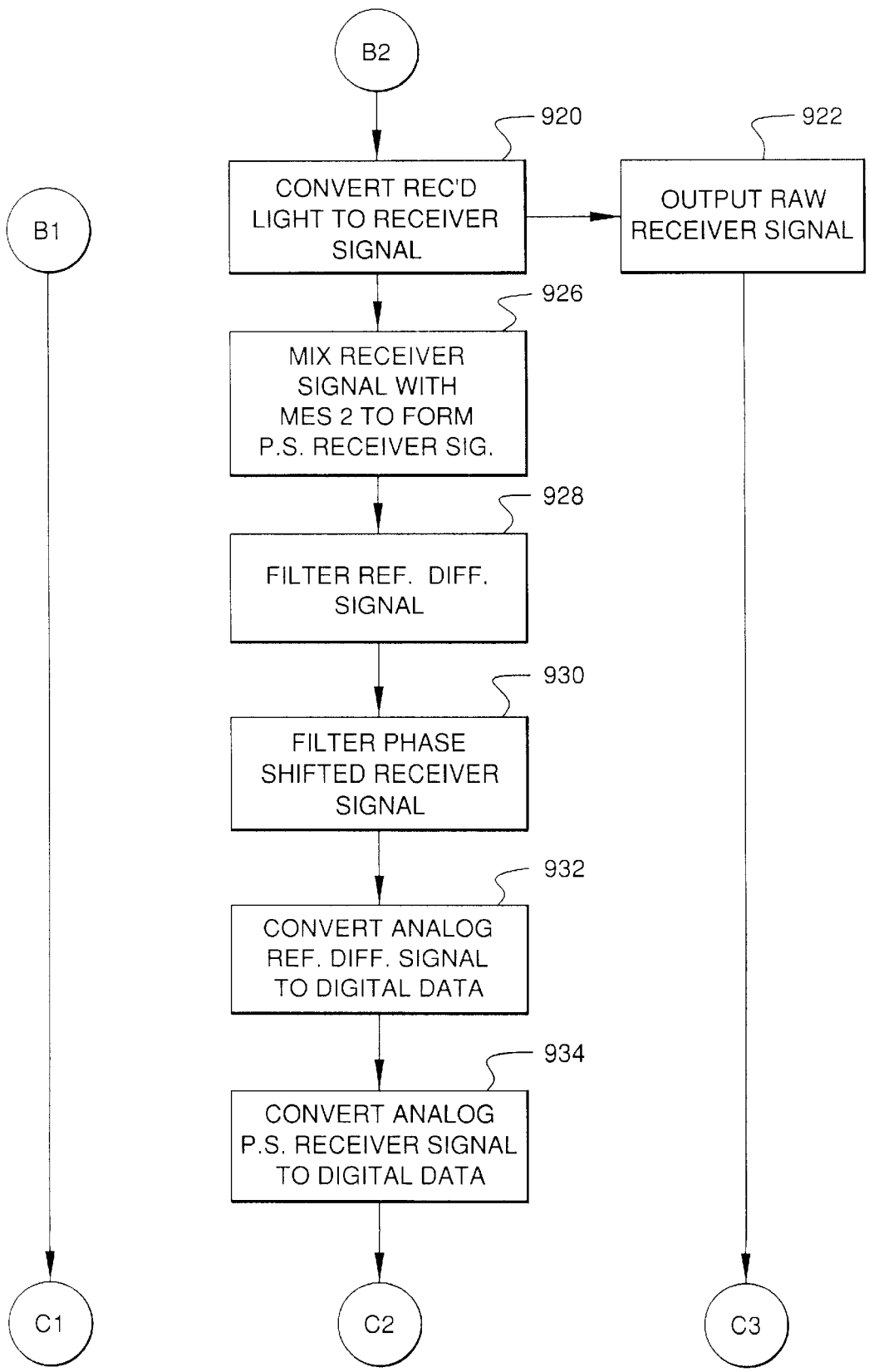
Figure 9C:
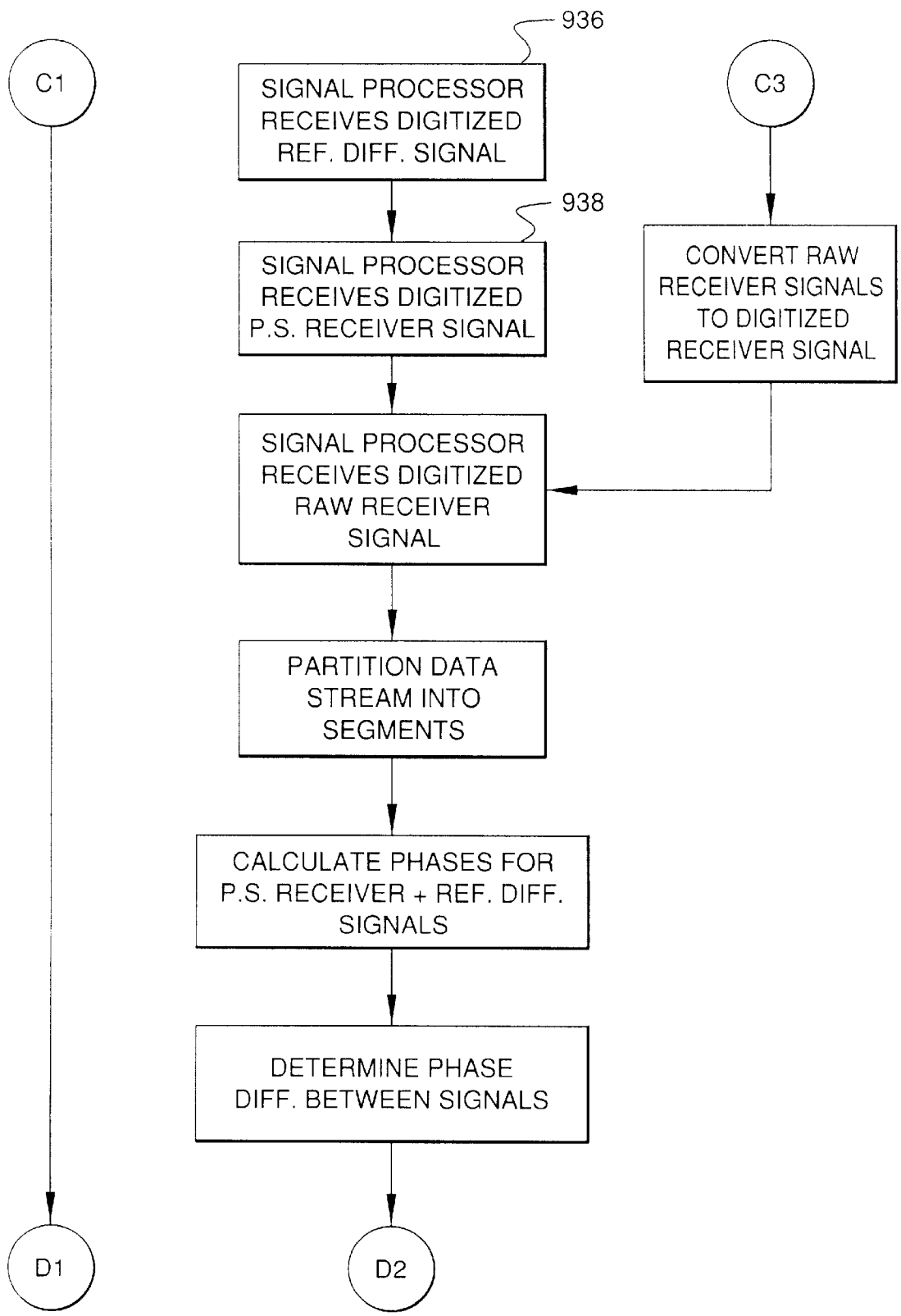
Figure 9D:
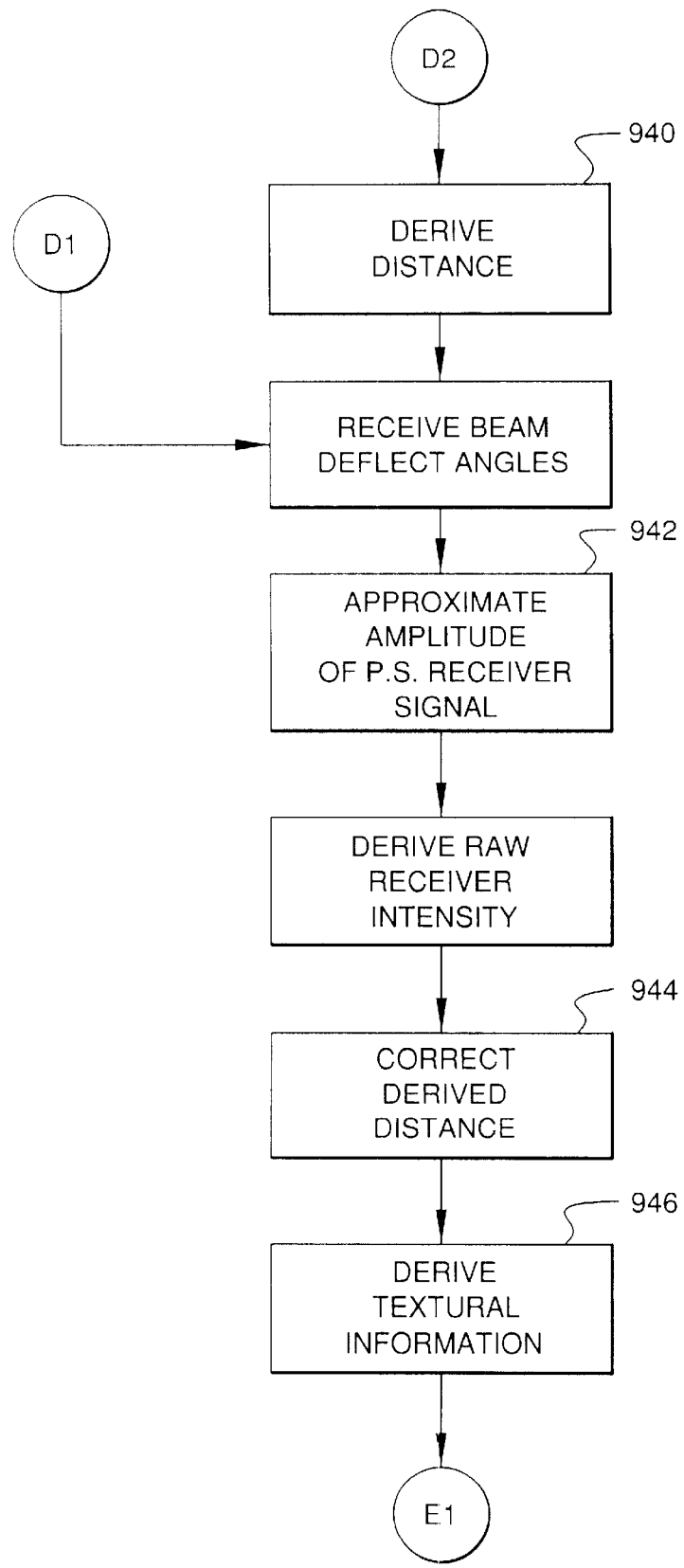
Figure 9E:
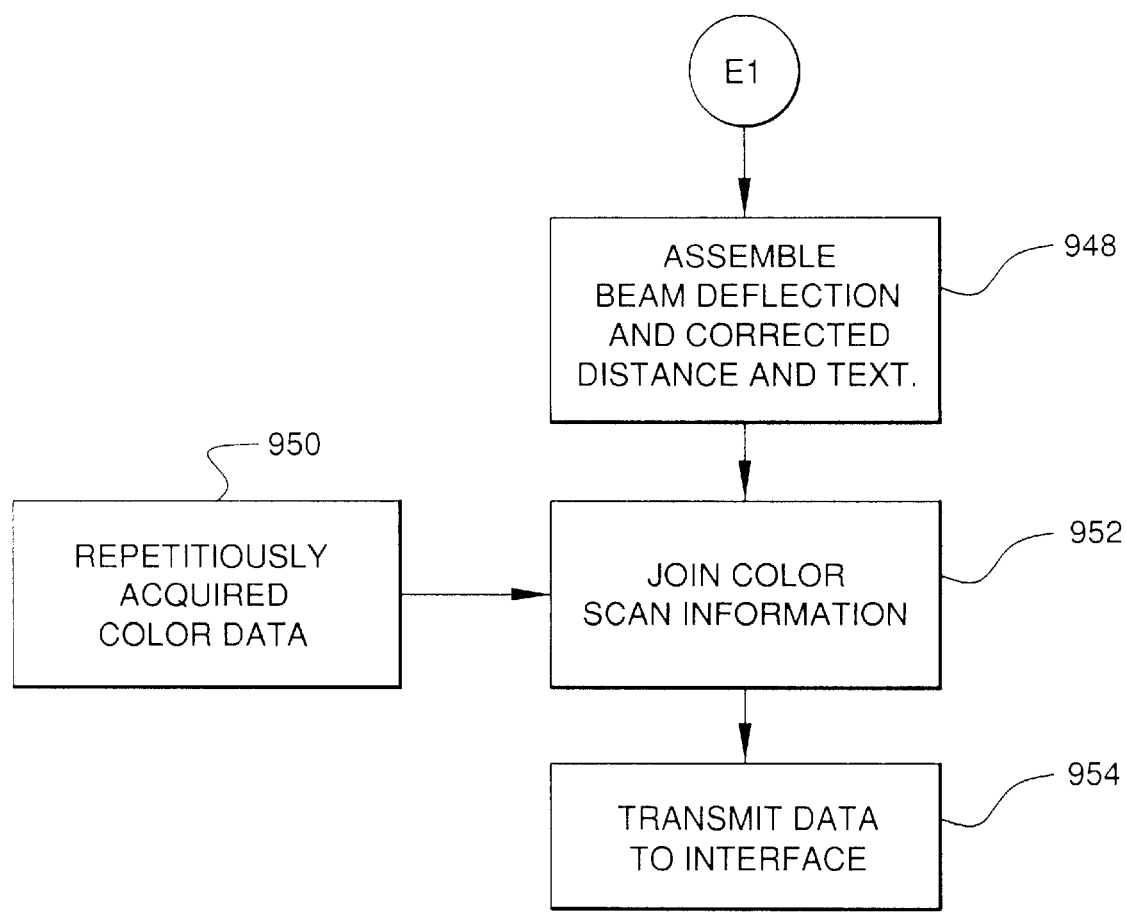

Application of the textural data regarding the surface being scanned allows the surface features of a displayed image according to the results of the scan, to be displayed with data associated with an external light source. A theoretical light source can be applied to the three dimensional image, such that surfaces having a high reflectivity, where the reflectivity is oriented towards the viewer, will appear brighter than matte surfaces, or surfaces whose reflectivity is oriented away from the viewer. Such an effect is shown in FIG. 8.

In addition to generating specific textural data regarding the surface being scanned, the use of light transmitters working in different areas of light spectrum, with a plurality of phase measurement subsystems, allows the scanner to be used to determine the color of the scanned portion of the surface of the object being scanned, allowing three-dimensional color scanning. This feature can be implemented by using three light beams, preferably red, green, and blue. The reflectivity of the surface of the object to each color can be determined, using the technique described for scanning textural information. The RGB textural data can be displayed as color data by using an RGB display, where the proportions of each color are determined by the intensity of the receiver signal for each color.

Process of Scanning An Object

The process of scanning an object 102 using the apparatus described above is initiated by generating 902 a first modulating electronic signal to a light generator. The light generator generates 904 a modulation light been corresponding to the modulating electronic signal. The light beam is then directed 906 towards an object being scanned. A second modulating electronic signal is also generated 908. A first mixer combines 910 the first and second modulated electronic signals to form a reference differential signal.

Directing the light beam towards the object is a continuous process which runs concurrently with the scanning of an object. The digital processor directs the optical wedges to be rotated by the optical wedge positioning motors. The signal processor determines the position of the optical wedges by the output of the sensors sensing 912 the encoding disks attached to the optical wedges. By deriving the position of the optical wedges from the output of the sensors, the digital processor can determine whether the rotations of the optical wedges are sufficient or insufficient to direct the light beam along a desired axis during scanning, and correct 914 the rotational positions as required. Beam direction angles can also be derived 916.

The photoreceiver continuously receives 918 light reflected, diffracted, or diffused from the surface of the object being scanned. The received light is converted 920 into an electrical signal, corresponding to the intensity of the received signal. The photoreceiver outputs this receiver signal to a mixer, which combines the receiver signal with the second modulating electronic signal to form a mixed receiver signal. The photoreceiver also outputs 922 a raw receiver signal (photocurrent) for the signal processor.

The receiver signal is then mixed 926 with the second modulating electronic signal to form the mixed receiver signal. The reference differential signal and the mixed receiver signal are then band-pass filtered 928, 930 to filter components of the signals not related to the modulating electronic signals or generated light beam. The filtered reference differential signal and the filtered mixed receiver signal are then converted to digital data 932, 934. A signal processor receives 936, 938 this digital data, and generates 940 a derived distance between the scanner and the object being scanned. The derived distance is calculated for segments of the receiver signal, where the segments correspond to location segments on the surface of the object being scanned. This data is combined with information regarding the positions of the optical wedges corresponding to the orientation of the optical wedges when a scan of a segment was occurring. Also, the signal processor may derive 944 and transmit data regarding the texture of the surface at each segment, or if a color scanner is implemented, data regarding the color of the surface of the segment being measured.

The process of deriving 944 the distance involves generating approximation values of the convolutions with sine and cosine, of the digitized reference differential signal and the digitized mixed receiver signal. These values are compared to determine the phase shift between the signals, and an initial approximation for the distance is derived from the phase shift.

When computing an initial approximation for the distance, phase uncertainty is resolved, preferably with the method of using multiple modulation frequencies, or alternatively, with the method of a priori assumptions.

The initial approximation of the distance is then corrected by determining 942 an approximation of the amplitude of the mixed receiver signal, the intensity of the digitized raw receiver output, and the deflection angle of the light beam, and using these values with a functional relation between the signals and the delay inherent in the photoreceiver. The function may be an approximation based on coefficients derived by scanning a known surface, and solving for the coefficients to determine an optimized relation between the corrected distance value and the known distance value. The digitized mixed receiver signal and the digitized raw receiver signal can also be used, using the above defined relations, to derive a value corresponding to the texture of the surface at a segment.

The individual segments of digitized signals are defined by partitioning the continuous signals into data sets, each data set corresponding to an individual segment. The partition boundaries are determined by reference to the clock signal. As the A/D converters preferably use a clock signal which is one sixth of the clock frequency of the digital signal processor, the data segments remain synchronized when a fixed number of clock cycles is used for each segment.

Once data for a segment has been obtained, data can be assembled 952 for transmission to the interface. If repetitious scans 950 have been made to generate color information, this data is added to the assembled data, and transmitted 954 to the interface.

The present invention may be embodied in other specific forms without departing from the spirit or essential attributes of the invention. Accordingly, reference should be made to the appended claims, rather than the foregoing specification, as indicating the scope of the invention.

What is claimed is:

1. An optical scanner for obtaining three-dimensional geometric information from a surface comprising:
   a mean for generating a first electronic modulation signal;
   a means for generating a second electronic modulation signal;
   a means for generating a modulated beam of light, said light beam corresponding to the first electronic modulation signal;
   a means for causing the modulated beam of light to be directed at a location on the surface to be measured, said means further including an output defining the orientation of the scanner to the object;
   a means for receiving light reflected, scattered or dispersed from a surface being measured, said means for receiving light including, a means for generating an output signal, the output signal corresponding to the received light;
   a first mixer, said mixer for generating a reference differential signal, wherein the reference differential signal is generated by mixing the first and second electronic modulation signals;
   a second mixer, said mixer for generating a mixed receiver signal, wherein the mixed receiver signal is generated by mixing the output signal of the means for receiving light with the second modulation signal;
   a first and a second analog signal filter, said first filter receiving the output signal of the first mixer and passing portions of the output signal having a frequency near a difference frequency, said first filter further outputting a filtered reference differential signal, said second filter receiving the output signal of the second mixer and passing portions of the output signal having a frequency near a difference frequency, said second filter further outputting a filtered mixed receiver signal;
   a first analog to digital converter, said converter converting the filtered reference differential signal from an analog waveform to digital information, said digital information corresponding to time and amplitude data;
   a second analog to digital converter, said second converter converting the filtered mixed receiver signal from an analog waveform to digital information, said digital information corresponding to time and amplitude data;
   a third analog to digital converter, said third analog to digital converter converting the raw receiver output from an analog waveform to digital information, said digital information corresponding to time and amplitude data; and
   a comparator means, said comparator means for comparing the digitized reference differential signal to the digitized mixed receiver signal, and deriving the distance between the scanner and an object being scanned by determining the phase shift between the digitized filtered reference differential signal and the digitized filtered mixed receiver signal.

2. A processor for determining the distance between a light source and a surface, the processor comprising:
   a clock, the clock outputting a clock signal;
   a first modulation signal generator, the first modulation signal generator receiving the clock signal and generating a first modulation signal, the first modulation signal related to the clock signal;
   a second modulation signal generator, the second modulation signal generator receiving the clock signal and generating a second modulation signal, the second modulation signal related to the clock signal;
   a light generator, the light generator generating modulated light corresponding to the first modulation signal;
   a light beam deflector, the light beam deflector further comprising a sensor for determining the position of the light beam deflector;
   a photoreceiver, the photoreceiver receiving light which has been generated by the light generator and reflected off of a surface being measured, the photoreceptor generating a raw photoreceptor signal, the raw photoreceptor signal corresponding to received light;
   a first mixer, the first mixer combing the first modulated signal and the second modulated signal, the first mixer further outputting a reference differential signal;
   a second mixer, the second mixer combing the second modulated signal and the raw photoreceptor signal, the second mixer further outputting a mixed receiver signal;
   a first and a second analog signal filter, said first filter receiving the output signal of the first mixer, passing portions of the output signal having a frequency near a difference frequency, and suppressing signals having a frequency greater than one half of the sampling rate of the first analog to digital converter, said first filter further outputting a filtered reference differential signal, said second filter receiving the output signal of the second mixer, passing portions of the output signal having a frequency near a difference frequency, and suppressing signals having a frequency greater than one half of the sampling rate of the second analog to digital converter, said second filter further outputting a filtered mixed receiver signal;
   a first analog-to-digital converter, the first analog-to-digital converter converting the filtered reference differential signal to a digitized reference differential signal;
   a second analog-to-digital converter, the second analog-to-digital converter converting the filtered mixed receiver signal to a digitized mixed receiver signal;
   a third analog-to-digital converter, the third analog-to-digital converter converting the raw receiver output to a digitized raw receiver output; and
   a digital signal processor, the digital signal processor receiving the digitized reference differential signal, the digitized mixed receiver signal, the digitized raw receiver output, and the clock signal, the digital signal processor further determining the phase difference between the modulated light corresponding to the first modulated signal generated by the light generator and the raw photoreceptor signal corresponding to received light, the digital signal processor further determining the distance traveled by the light beam between the light generator and the photoreceptor, and determining a correction factor for the distance traveled by the beam of light, said correction factor compensating for delays inherent in the photoreceiver.

3. An optical scanner for obtaining three-dimensional geometric information from a surface comprising:

a means for generating a first electronic modulation signal;

a means for generating a second electronic modulation signal;

a means for generating a modulated beam of light, said light beam corresponding to the first electronic modulation signal;

a means for causing the modulated beam of light to be directed at a location on the surface to be measured, said means further including an output defining the orientation of the scanner to the object;

a means for receiving light reflected, scattered or dispersed from a surface being measured, said means for receiving light including a means for generating an output signal, the output signal corresponding to the received light;

a first mixer, said mixer for generating a reference differential signal, wherein the reference differential signal is generated by mixing the first and second electronic modulation signals;

a second mixer, said mixer for generating a mixed receiver signal, wherein the mixed receiver signal is generated by mixing the output signal of the means for receiving light with the second modulation signal;

a first and a second analog signal filter, said first filter receiving the output signal of the first mixer and passing portions of the output signal having a frequency near a difference frequency, said first filter further outputting a filtered reference differential signal, said second filter receiving the output signal of the second mixer and passing portions of the output signal having a frequency near a difference frequency, said second filter further outputting a filtered mixed receiver signal;

a first analog to digital converter, said converter converting the filtered reference differential signal from an analog waveform to digital information, said digital information corresponding to time and amplitude data;

a second analog to digital converter, said second converter converting the filtered mixed receiver signal from an analog waveform to digital information, said digital information corresponding to time and amplitude data;

a comparator means, said comparator means for comparing the digitized reference differential signal to the digitized mixed receiver signal, and deriving the distance between the scanner and an object being scanned by determining the phase shift between the digitized reference differential signal and the digitized mixed receiver signal.

4. A processor for determining the distance between a light source and a surface, the processor comprising:

a clock, the clock outputting a clock signal;

a first modulation signal generator, the first modulation signal generator receiving the clock signal and generating a fist modulation signal, the first modulation signal related to the clock signal;

a second modulation signal generators the second modulation signal generator receiving the clock signal and generating a second modulation signals the second modulation signal related to the clock signal;

a light generator, the light generator generating modulated light corresponding to the first modulation signal;

a light beam deflector, the light beam deflector further comprising a sensor for determining the position of the light beam deflector;

a photoreceiver, the photoreceiver receiving light which has been generated by the light generator and reflected off of a surface being measured, the photoreceptor generating a raw photoreceptor signal, the raw photoreceptor signal corresponding to received light;

a first mixer, the first mixer combing the first modulated signal and the second modulated signal, the first mixer further outputting a reference differential signal;

a second mixer, the second mixer combing the second modulated signal and the raw photoreceptor signal, the second mixer further outputting a mixed receiver signal;

a first and a second analog signal filters said first filter receiving the output signal of the first mixer, passing portions of the output signal having a frequency near a difference frequency, and suppressing signals having a frequency greater than one half of the sampling rate of the first analog to digital converter, said first filter further outputting a filtered reference differential signal, said second filter receiving the output signal of the second mixer, passing portions of the output signal having a frequency near a difference frequency, and suppressing signals having a frequency greater than one half of the sampling rate of the second analog to digital converter, said second filter further outputting a filtered mixed receiver signal;

a first analog-to-digital converter, the first analog-to-digital converter converting the reference differential signal to a digitized reference differential signal;

a second analog-to-digital converter, the second analog-to-digital converter converting the mixed receiver signal to a digitized mixed receiver signal;

a digital signal processor, the digital signal processor receiving the digitized reference differential signal, the digitized mixed receiver signal, and the clock signal, the digital signal processor further determining the phase difference between the modulated light corresponding to the first modulated signal generated by the light generator and the raw photoreceptor signal corresponding to received light, the digital signal processor further determining the distance traveled by the light bean between the light generator and the photoreceptor, and determining a correction factor for the distance traveled by the beam of light, said correction factor compensating for delays inherent in the photoreceiver.

* * * * *